US012772322B2

(12) United States Patent
Mo et al.

(10) Patent No.: US 12,772,322 B2
(45) Date of Patent: Oct. 20, 2026

(54) DATA TRANSMISSION METHOD FOR SMALL DATA TRANSMISSION (SDT) AND TERMINAL

(71) Applicant: VIVO MOBILE COMMUNICATION CO., LTD., Dongguan (CN)

(72) Inventors: Yitao Mo, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 210 days.

(21) Appl. No.: 18/443,379

(22) Filed: Feb. 16, 2024

(65) Prior Publication Data

US 2024/0188166 A1 Jun. 6, 2024

Related U.S. Application Data

(63) Continuation of application No. PCT/CN2022/113568, filed on Aug. 19, 2022.

(30) Foreign Application Priority Data

Aug. 20, 2021 (CN) ......................... 202110962104.0

(51) Int. Cl.
*H04L 5/00* (2006.01)
*H04L 1/08* (2006.01)
(Continued)

(52) U.S. Cl.
CPC ............... *H04W 76/20* (2018.02); *H04L 1/08* (2013.01); *H04W 72/0446* (2013.01); *H04W 72/232* (2023.01)

(58) Field of Classification Search
CPC ......... H04L 1/08; H04L 1/1819; H04L 1/189; H04L 1/1896; H04L 5/00; H04W 24/02;
(Continued)

(56) References Cited

U.S. PATENT DOCUMENTS 11,582,790 B2 * 2/2023 Tsai .................. H04W 72/1268
11,627,632 B2 * 4/2023 Kim ...................... H04W 76/28
370/329
(Continued)

FOREIGN PATENT DOCUMENTS

CN 108418659 A 8/2018
CN 111786756 A 10/2020
(Continued)

OTHER PUBLICATIONS

VIVO, "Discussion on RAN1 impacts for small data transmission", 3GPP TSG RAN WG1 #105-e, e-Meeting, May 10-27, 2021, R1-2105453.

*Primary Examiner* — Frank Duong
(74) *Attorney, Agent, or Firm* — The Webb Law Firm

(57) ABSTRACT

A data transmission method for SDT includes a terminal obtains first configuration information, where the first configuration information includes at least one of a transmission resource or a transmission configuration parameter that are for SDT; the terminal determines, after an SDT procedure is triggered, a target quantity of times of retransmission; and the terminal performs retransmission based on the first configuration information and the target quantity of times of retransmission.

18 Claims, 2 Drawing Sheets

(51) Int. Cl.
*H04W 72/0446* (2023.01)
*H04W 72/232* (2023.01)
*H04W 76/20* (2018.01)

(58) Field of Classification Search
CPC ........... H04W 72/0446; H04W 72/115; H04W 72/23; H04W 72/232; H04W 74/006; H04W 74/0833; H04W 76/20; H04W 76/27; H04W 76/30; H04W 76/34
See application file for complete search history.

(56) References Cited

U.S. PATENT DOCUMENTS

| | | | | |
|---|---|---|---|---|
| 2017/0099660 | A1 | 4/2017 | Oh | |
| 2021/0410180 | A1* | 12/2021 | Tsai | H04L 1/1819 |
| 2022/0022140 | A1 | 1/2022 | Xing et al. | |
| 2022/0022247 | A1* | 1/2022 | Agiwal | H04W 72/0453 |
| 2022/0232659 | A1* | 7/2022 | Kim | H04W 76/28 |
| 2022/0417983 | A1* | 12/2022 | Tsai | H04W 56/004 |
| 2023/0040421 | A1* | 2/2023 | Tsai | H04W 72/115 |
| 2023/0189245 | A1* | 6/2023 | Alfarhan | H04L 1/1854 370/329 |
| 2023/0224953 | A1* | 7/2023 | Xiong | H04L 1/0009 370/329 |
| 2023/0422149 | A1* | 12/2023 | Kim | H04W 48/06 |

FOREIGN PATENT DOCUMENTS

| | | | |
|---|---|---|---|
| CN | 112839378 | A | 5/2021 |
| WO | 2020256420 | A1 | 12/2020 |
| WO | 2021102837 | A1 | 6/2021 |

* cited by examiner

DATA TRANSMISSION METHOD FOR SMALL DATA TRANSMISSION (SDT) AND TERMINAL

CROSS-REFERENCE TO RELATED APPLICATIONS

This application is a Bypass Continuation Application of International Patent Application No. PCT/CN2022/113568, filed Aug. 19, 2022, and claims priority to Chinese Patent Application No. 202110962104.0, filed Aug. 20, 2021 in China, the disclosures of which are hereby incorporated by reference in their entireties.

BACKGROUND OF THE INVENTION

Field of the Invention

This application pertains to the field of communications technologies, and relates to a data transmission method for small data transmission (SDT) and a terminal.

Description of Related Art

In a new radio (NR) system, to reduce resource overheads in a communication process, a terminal in an idle or inactive state may complete a data transmission procedure by small data transmission (that is, complete data transmission through a very simple signaling procedure).

However, as there lacks a signaling exchange procedure in the small data transmission procedure, in an area with relatively poor signal coverage, reliability of transmission in the small data transmission procedure is low.

SUMMARY OF THE INVENTION

Embodiments of this application provide a data transmission method for small data transmission SDT and a terminal.

According to a first aspect, a data transmission method for small data transmission SDT is provided. The method includes: a terminal obtains first configuration information, where the first configuration information includes at least one of a transmission resource or a transmission configuration parameter that are for SDT; the terminal determines, after an SDT procedure is triggered, a target quantity of times of retransmission; and the terminal performs retransmission based on the first configuration information and the target quantity of times of retransmission.

According to a second aspect, a data transmission apparatus for small data transmission SDT is provided. The apparatus includes an obtaining module, a determining module, and a performing module. The obtaining module is configured to obtain first configuration information, where the first configuration information includes at least one of a transmission resource or a transmission configuration parameter that are for SDT; the determining module is configured to determine, after an SDT procedure is triggered, a target quantity of times of retransmission; and the performing module is configured to perform retransmission based on the first configuration information and the target quantity of times of retransmission determined by the determining module.

According to a third aspect, a terminal is provided. The terminal includes a processor, a memory, and a program or an instruction that is stored in the memory and that is executable on the processor. When the program or instruction is executed by the processor, steps of the method according to the first aspect are implemented.

According to a fourth aspect, a terminal is provided. The terminal includes a processor and a communications interface. The communications interface is configured to obtain first configuration information, where the first configuration information includes a transmission resource and/or a transmission configuration parameter for SDT; the processor is configured to determine, after an SDT procedure is triggered, a target quantity of times of retransmission; and the communications interface is configured to perform retransmission based on the first configuration information and the target quantity of times of retransmission.

According to a fifth aspect, a non-transitory readable storage medium is provided. The non-transitory readable storage medium stores a program or an instruction, and when the program or the instruction is executed by a processor, steps of the method according to the first aspect or the third aspect are implemented.

According to a sixth aspect, a chip is provided. The chip includes a processor and a communication interface. The communication interface is coupled to the processor, and the processor is configured to run a program or an instruction to perform the method in the first aspect.

According to a seventh aspect, a computer program/program product is provided. The computer program/program product is stored in a non-volatile storage medium, and the program/program product is executed by at least one processor to implement steps of the data transmission method for small data transmission SDT according to the first aspect.

DESCRIPTION OF THE INVENTION

The following clearly describes technical solutions in embodiments of this application with reference to the accompanying drawings in the embodiments of this application. Clearly, the described embodiments are some of but not all the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects instead of describing a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, “and/or” represents at least one of connected objects, and a character “/” generally represents an “or” relationship between associated objects.

It should be noted that, the technologies described in the embodiments of this application are not limited to a long term evolution (LTE)/LTE-advanced (LTE-A) system, and can also be used in other wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms “system” and “network” in the embodiments of this application may be used interchangeably. The technologies described herein can be applied to both the systems and the radio technologies mentioned above as well as to other systems and radio technologies. The following describes a new radio (NR) system as an example, and terminology in NR is used in most of the following descriptions, but these technologies may alternatively be applied to an application other than an NR system application, for example, a 6th generation (6th Generation, 6G) communications system.

Figure 1:
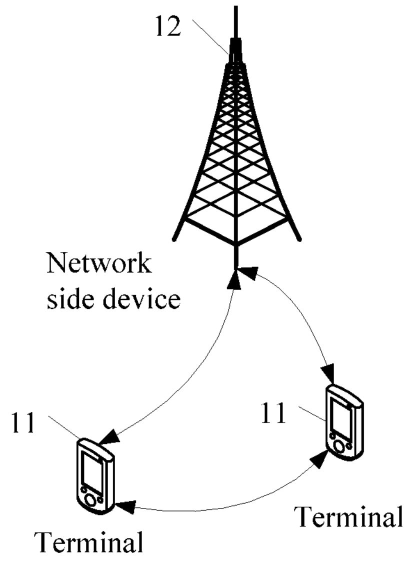
FIG. 1 is a system architecture diagram of a communications system according to an embodiment of this application.

FIG. 1 is a block diagram of a wireless communications system to which embodiments of this application can be applied. The wireless communications system includes a terminal 11 and a network side device 12. The terminal 11 may be a terminal side device, for example, a mobile phone, a tablet personal computer, a laptop computer or notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, vehicle user equipment (VUE), pedestrian user equipment (PUE), or smart household (a household device having a wireless communication function, for example, a refrigerator, a television, a washing machine, or a piece of furniture). The wearable device includes a smart watch, a smart band, a smart headset, smart glasses, a smart ornament (a smart bangle, a smart bracelet, a smart ring, a smart necklace, a smart ankle bangle, a smart anklet, or the like), a smart wrist strip, smart clothes, a game machine, and the like. It should be noted that a specific type of the terminal 11 is not limited in this embodiment of this application. The network side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. As long as same technical effect is achieved, the base station is not limited to a specified technical term. It should be noted that, in the embodiments of this application, only a base station in an NR system is used as an example, but a specific type of the base station is not limited.

Because the foregoing data transmission manner for small data transmission does not require RRC state transition or RRC connection establishment, a lot of signaling overheads can be reduced. In a related technology, a terminal in an idle or inactive tate performs one-off data transmission in a small data transmission procedure. Generally, data to be transmitted during small data transmission is carried on a dedicated traffic channel (DTCH) and transmitted after the data is multiplexed with an uplink RRC connection resume request message, to complete a procedure for transmitting the data to be transmitted.

Terms used in the embodiments of this application are explained below.

1. Small Data Transmission

Small data transmission is a data transmission mode specific to a terminal in a non-connected state that can complete small data transmission through a very simple signaling exchange procedure, with the purpose of avoiding causing RRC state transition and RRC connection establishment and avoiding excessive signaling overheads.

A feature of the small data transmission solution is that a current data radio bearer (DRB) of the terminal is in a suspended state but not a released state. Therefore, the terminal may resume the DRB before sending a resume request message ResumeRequest, and then use RRC signaling to carry data. In this case, as in a connected state, the terminal can transmit data on the DRB. In this way, state transition is avoided, and efficient small data transmission can be achieved with relatively low signaling overheads.

Data to be transmitted during small data transmission is carried on a dedicated traffic channel (DTCH) and is transmitted after the data is multiplexed with an uplink RRC connection resume request message. Similarly, if there is a returned downlink message, the data may also be carried on the DTCH and transmitted after the data is multiplexed with a downlink RRC connection release message.

2. Retransmission

In Rel-15 and Rel-16 NR systems, UE compulsorily has a capability of retransmission on a physical uplink shared channel (PUSCH) and a physical downlink shared channel (PDSCH). In other words, the UE definitely supports PUSCH/PDSCH retransmission.

In actual application, a network side device may indicate, by using an RRC signaling configuration (for example, pusch-AggregationFactor or pdsch-AggregationFactor), a quantity of times of retransmitting a PUSCH or a PDSCH dynamically scheduled by a terminal. The terminal performs PUSCH or PDSCH retransmission in several continuous slots based on the indication.

With reference to the accompanying drawings, a data transmission method for small data transmission provided in the embodiments of this application is described below by using some embodiments and application scenarios.

Figure 2:
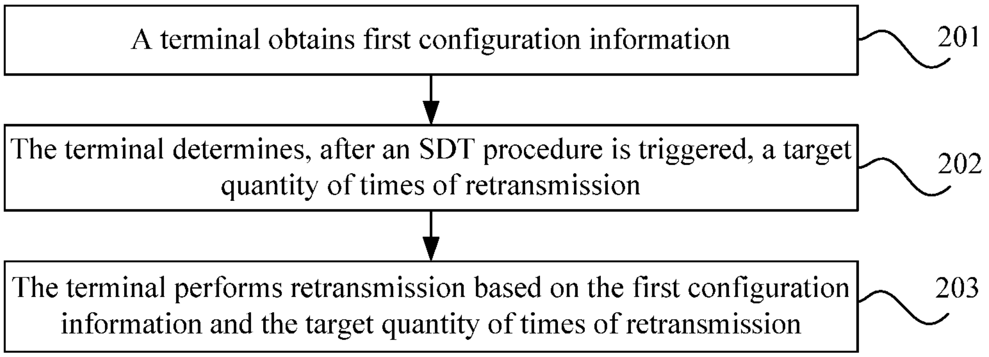
FIG. 2 is a flowchart of a data transmission method for small data transmission SDT according to an embodiment of this application.

FIG. 2 is a schematic flowchart of a data transmission method for small data transmission SDT according to an embodiment of this application. As shown in FIG. 2, the data transmission method for small data transmission SDT may include step 201 to step 203.

Step 201: a terminal obtains first configuration information.

In this embodiment of this application, the first configuration information includes at least one of a transmission resource or a transmission configuration parameter that are for SDT.

In this embodiment of this application, the first configuration information may be a broadcast message, or may be a terminal-specific message, for example, an RRC release message.

In this embodiment of this application, the first configuration information may be a message obtained by the terminal from a network side device.

For example, the first configuration information may include at least one of the following: a supported quantity of times of retransmitting a PUSCH/PDSCH that is indicated by the network side device, a redundancy version (RV)

transmission sequence, a corresponding downlink (DL) pathloss reference threshold, a time domain resource allocation (TDRA) list for PUSCH/PDSCH retransmission, a preamble (Preamble) for coverage enhancement, a preamble group for coverage enhancement, or a quantity of times of retransmitting a CG PUSCH that is specified in a configured grant CG configuration.

Step 202: the terminal determines, after an SDT procedure is triggered, a target quantity of times of retransmission.

In this embodiment of this application, the target quantity of times of retransmission may be determined by the terminal based on information obtained from the network side device, or may be determined by the terminal based on all information in the obtained first configuration information.

In this embodiment of this application, a manner in which the terminal determines the by the target quantity of times of retransmission may be user-defined, or may be preset by the terminal.

Step 203: the terminal performs retransmission based on the first configuration information and the target quantity of times of retransmission.

In this embodiment of this application, after determining target information and then determining the target quantity of times of retransmission, the terminal may perform, in a transmission environment determined based on the first configuration information, data retransmission the target quantity of times of retransmission.

It can be understood that, in the foregoing retransmission process, small data is retransmitted. Optionally, unlike conventional one-off transmission of small data, the data may be transmitted a plurality of times based on the target quantity of times of retransmission after the target quantity of times of retransmission is determined.

In this embodiment of this application, the terminal first obtains the first configuration information that includes at least one of the transmission resource or the transmission configuration parameter that are for SDT, then the terminal determines the target quantity of times of retransmission after triggering the SDT procedure, and finally, the terminal performs retransmission based on the first configuration information and the target quantity of times of retransmission. In this way, the terminal can perform, after the small data transmission procedure is triggered, retransmission based on the determined quantity of times of retransmission, to avoid a data transmission failure due to a lack of a signaling exchange procedure in the transmission procedure because of one-off transmission in an area with relatively poor signal coverage.

Optionally, in this embodiment of this application, in step 202 in which the terminal determines the target quantity of times of retransmission, the data transmission method for small data transmission SDT provided in this embodiment of this application may include the following step B1 and step B2.

Step B1: the terminal determines target information.

Step B2: the terminal determines, based on the target information, the target quantity of times of retransmission.

For example, the target information is used to instruct the terminal to perform retransmission the target quantity of times of retransmission in the SDT procedure.

In this embodiment of this application, the target information instructs the terminal to perform retransmission the target quantity of times of retransmission in the SDT procedure.

In this embodiment of this application, the target information may be determined by the terminal based on information obtained from the network side device, or may be determined by the terminal based on all information in the obtained first configuration information.

Optionally, in this embodiment of this application, in step 201 for determining the target information, the data transmission method for small data transmission SDT provided in this embodiment of this application may further include the following step C1.

Step C1: when a pre-specified condition is met, the terminal generates report information, and sends the report information to the network side device.

Based on this, in step B1 for determining the target information, the data transmission method for small data transmission SDT provided in this embodiment of this application may further include the following step C2.

Step C2: the terminal receives second information from the network side device.

For example, the second information is used to indicate the target quantity of times of retransmission.

Optionally, in this embodiment of this application, that the pre-specified condition is met includes at least one of the following that: a downlink DL pathloss reference measured by the terminal is less than or equal to a pre-specified threshold; or there is SDT data to be transmitted by the terminal.

For example, the pre-specified threshold may be preset, or may be configured by the network side device.

For example, the pre-specified threshold may be a reference threshold.

It should be noted that the SDT data is configured to be a data bearer that allows SDT.

For example, the SDT data to be transmitted may be at least one of the following: a buffer status report (BSR) that is generated by the terminal or that is used for reporting a data amount on a logical channel corresponding to the data bearer for SDT, and data that can be obtained on the logical channel corresponding to the data bearer for SDT.

Optionally, in this embodiment of this application, the report information includes media access control control element (MAC CE) or terminal assistance information.

Optionally, in this embodiment of this application, the report information carries at least one of the following pieces of parameter information:

a DL pathloss reference measured by the terminal;

a measurement result corresponding to a downlink reference signal selected by the terminal;

information indicating that the terminal has a retransmission capability; or information indicating the terminal to request to perform uplink retransmission.

For example, when manners of reporting information are different, parameter information carried in the report information is not completely the same.

In an example, the DL pathloss reference may be a layer 1 reference signal received power (L1-RSRP).

In an example, the measurement result corresponding to the downlink reference signal may be an L1-RSRP result corresponding to a synchronization signal and PBCH block (SSB).

For example, the downlink reference signal may be a plurality of types of different signals, for example, an SSB, a channel state information reference signal resource indicator (CSI-RS RI), or a tracking reference signal (TRS).

In an example, when the report information is the media access control control element (MAC CE), parameter information carried on the MAC CE may include at least one of the following: the DL pathloss reference measured by the terminal, a measurement result corresponding to an SSB selected and measured by the terminal, or first identification information. The first identification information is used to indicate an identifier of a logical channel corresponding to the MAC CE. In addition, the MAC CE may not carry any content. After the terminal reports the MAC CE to the network side device, the network side device may learn, based on the first identification information, that the terminal requests to perform uplink retransmission.

In an example, when the report information is the terminal assistance information, parameter information carried in the terminal assistance information may include at least one of the following: the DL pathloss reference measured by the terminal, a measurement result corresponding to an SSB selected and measured by the terminal, the information indicating that the terminal has the retransmission capability, or the information indicating the terminal to request to perform uplink retransmission.

Optionally, in this embodiment of this application, in step C1 in which the terminal generates the report information, the data transmission method for small data transmission SDT provided in this embodiment of this application may further include the following step D.

Step D: the terminal indicates to multiplex and assemble entities to generate the report information.

Optionally, in this embodiment of this application, the second information includes first downlink control information (DCI).

For example, the first DCI is used for scheduling a target channel.

Optionally, in this embodiment of this application, before step 203, the data transmission method for small data transmission SDT provided in this embodiment of this application may further include the following step E.

Step E: the terminal determines, based on the first DCI, the target quantity of times of retransmission corresponding to retransmission on the target channel in the SDT procedure.

For example, the target channel may be a PUSCH.

For example, the DCI is DCI that is sent by the network side device and received by the terminal and that is used for scheduling.

It should be noted that the first DCI is based on the dynamically scheduled target channel in a process of target channel scheduling.

Optionally, in this embodiment of this application, the first DCI includes a target field, and a field value in the target field is used to indicate the target quantity of times of retransmission.

In an example, the target field may be an RV field in the first DCI. The RV field is a two-bit field.

For example, after receiving the first DCI sent by the network side device, the terminal parses the target field in the first DCI, and target content obtained through parsing may be used to indicate the target quantity of times of retransmission.

It can be understood that, a parsing manner corresponding to the network side device is pre-stored on the terminal. The parsing manner may be used for parsing the target field, to use content in the target field to indicate the target quantity of times of retransmission.

For example, when the target field is the RV field in the first DCI, the parsing manner pre-stored on the terminal is that if an identifier in the RV field is 00, it indicates that the target quantity of times of retransmission is 1; if an identifier in the RV field is 01, it indicates that the target quantity of times of retransmission is 2; if an identifier in the RV field is 10, it indicates that the target quantity of times of retransmission is 4; or if an identifier in the RV field is 11, it indicates that the target quantity of times of retransmission is 8. After receiving the first DCI, the terminal parses the RV field in the first DCI, determines the target quantity of times of retransmission, and performs retransmission based on the target quantity of times of retransmission.

For example, after determining the target quantity of times of retransmission, the terminal may perform retransmission on the target channel based on the first DCI.

In this way, the terminal may obtain the quantity of times of retransmission accurately by parsing the target field in the DCI and perform retransmission based on the quantity of times of retransmission indicated by the network side device, to improve reliability of data transmission.

Optionally, in this embodiment of this application, the first configuration information further includes a first time domain resource allocation TDRA list, where the first TDRA list is used for configuring a quantity of times of retransmission on the target channel. The second information includes second DCI, where the second DCI is DCI scheduled by the network side device. Based on this, after step 202, the data transmission method for small data transmission SDT provided in this embodiment of this application may further include the following step F.

Step F: the terminal determines, based on the second DCI and the first TDRA list, the target quantity of times of retransmission.

It can be understood that the terminal may directly obtain, based on the first TDRA list, the target quantity of times of retransmission.

For example, the DCI is DCI that is received by the terminal and that is scheduled by the network side device.

For example, the second DCI may be used for scheduling the target channel, for example, a PUSCH.

For example, when the first configuration information includes the RV transmission sequence, the terminal may perform retransmission based on the target quantity of times of retransmission and the RV transmission sequence.

For example, after determining the target quantity of times of retransmission, the terminal may perform retransmission on the target channel based on the second DCI.

In this way, the target quantity of times of retransmission may be directly determined based on the TDRA list in the first configuration information obtained from the network side device, and retransmission is performed based on the target quantity of times of retransmission.

Optionally, in this embodiment of this application, before step C, the data transmission method for small data transmission SDT provided in this embodiment of this application may further include the following step G.

Step G: the terminal uses the first TDRA list, and ignores a second TDRA list.

For example, the first TDRA list and the second TDRA list are different.

For example, the second TDRA list is a TDRA list agreed in a protocol and/or a TDRA list that is in system information and that does not belong to an SDT configuration.

Optionally, in this embodiment of this application, the target information includes random access preamble resource configuration information included in the first configuration information, and the random access preamble resource configuration information includes at least one of the following: configuration information of a random access preamble or configuration information of a random access preamble group, and the random access preamble resource configuration information is used for requesting for retransmission. In step 203, the data transmission method for small data transmission SDT provided in this embodiment of this application may further include the following step H.

Step H: after triggering a first SDT procedure, in a case in which a MAC entity of the terminal selects a random access preamble resource in the random access preamble resource configuration information, the terminal determines that the target quantity of times of retransmission is equal to a quantity of times of transmitting target information Msg3.

For example, the quantity of times of transmitting target Msg3 includes a quantity of times of retransmission corresponding to a latest time of initial transmission of Msg3, or a quantity of times of retransmission corresponding to a latest time of retransmission of Msg3.

For example, the first SDT procedure may be a random access SDT (RA-SDT) procedure.

For example, the latest time means a transmission procedure in the last time of transmitting Msg3 before a retransmission procedure currently performed by the terminal.

For example, the random access preamble resource includes at least one of the following: a preamble, or a preamble group.

In this way, if the terminal performed retransmission for data transmission before, the terminal may determine, based on information about a latest time of retransmission already included in the random access preamble resource configuration information, a target quantity of times of retransmission for retransmission this time, and then perform retransmission based on the target quantity of times of retransmission.

Optionally, in this embodiment of this application, the first configuration information includes second configuration information in a configured grant CG corresponding to the terminal. Based on this, in step 203, the data transmission method for small data transmission SDT provided in this embodiment of this application may include the following step I.

Step I: after triggering a second SDT procedure, the terminal determines that the target quantity of times of retransmission is a quantity of times of retransmission indicated by the second configuration information.

For example, the second SDT procedure may be a configured grant SDT (CG-SDT) procedure.

For example, the quantity of times of retransmission indicated by the second configuration information is equal to a quantity of times of CG transmission.

Optionally, the quantity of times of retransmission indicated by the second configuration information may be a quantity of time corresponding to a latest time of CG transmission performed by the terminal. In an example, the quantity of times of CG transmission includes a quantity of times of retransmission corresponding to a latest time of initial CG transmission.

In another example, the quantity of times of CG transmission includes a quantity of times of retransmission corresponding to a latest time of CG retransmission.

In this way, if the terminal performed retransmission for data transmission before, the terminal may determine, based on the second configuration information in the configured grant CG corresponding to the terminal, a target quantity of times of retransmission for retransmission this time, and then perform retransmission based on the target quantity of times of retransmission.

It should be noted that, the data transmission method for small data transmission SDT provided in this embodiment of this application may be performed by a data transmission apparatus for small data transmission SDT or a control module that is in the data transmission apparatus for small data transmission SDT and that is configured to perform the data transmission method for small data transmission SDT. In an embodiment of this application, the data transmission apparatus for small data transmission SDT provided in this embodiment of this application is described by using an example in which the data transmission apparatus for small data transmission SDT performs the data transmission method for small data transmission SDT.

Figure 3:
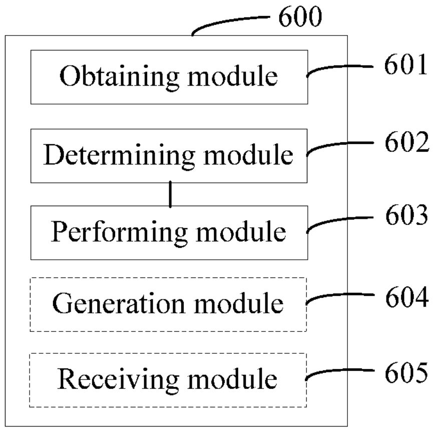
FIG. 3 is a schematic diagram of a structure of a data transmission apparatus for small data transmission SDT according to an embodiment of this application.

FIG. 3 is a schematic diagram of a possible structure of a data transmission apparatus for small data transmission SDT for implementing an embodiment of this application. As shown in FIG. 3, the apparatus 600 includes an obtaining module 601, a determining module 602, and a performing module 603. The obtaining module 601 is configured to obtain first configuration information, where the first configuration information includes at least one of a transmission resource or a transmission configuration parameter that are for SDT; the determining module 602 is configured to determine, after an SDT procedure is triggered, a target quantity of times of retransmission; and the performing module 603 is configured to perform retransmission based on the first configuration information and the target quantity of times of retransmission determined by the determining module 602.

According to the data transmission apparatus for small data transmission SDT in this embodiment of this application, the data transmission apparatus for small data transmission SDT first obtains the first configuration information that includes at least one of the transmission resource or the transmission configuration parameter that are for SDT, then the data transmission apparatus for small data transmission SDT determines the target quantity of times of retransmission after triggering the SDT procedure, and finally, the data transmission apparatus for small data transmission SDT performs retransmission based on the first configuration information and the target quantity of times of retransmission. In this way, the data transmission apparatus for small data transmission SDT can perform, after the small data transmission procedure is triggered, retransmission based on the determined quantity of times of retransmission, to avoid a data transmission failure due to a lack of a signaling exchange procedure in the transmission procedure because of one-off transmission in an area with relatively poor signal coverage.

Optionally, in this embodiment of this application, the determining module is configured to determine target information, where the target information is used to instruct the terminal to perform retransmission the target quantity of times of retransmission in the SDT procedure; and the determining module is further configured to determine, based on the target information, the target quantity of times of retransmission.

Optionally, in this embodiment of this application, the apparatus 600 further includes a generation module 604 and a receiving module 605. The generation module 604 is configured to: when a pre-specified condition is met, generate report information, and send the report information to a network side device. The receiving module 605 is configured to receive second information from the network side device, where the second information is used to indicate the target quantity of times of retransmission.

Optionally, in this embodiment of this application, that the pre-specified condition is met includes at least one of the following that: a downlink DL pathloss reference measured by the terminal is less than or equal to a pre-specified threshold; or there is SDT data to be transmitted by the terminal.

Optionally, in this embodiment of this application, the report information carries at least one of the following pieces of parameter information: a result of the DL pathloss reference measured by the terminal, a measurement result corresponding to a downlink reference signal selected by the terminal, information indicating that the terminal has a retransmission capability, or information indicating the terminal to request to perform uplink retransmission.

Optionally, in this embodiment of this application, the second information includes first DCI. The first DCI is used for scheduling a target channel.

Optionally, in this embodiment of this application, the determining module is further configured to determine, based on the first DCI, the target quantity of times of retransmission corresponding to retransmission on the target channel in the SDT procedure.

Optionally, in this embodiment of this application, the first DCI includes a target field, and a field value in the target field is used to indicate the target quantity of times of retransmission.

Optionally, in this embodiment of this application, the first configuration information further includes a first time domain resource allocation TDRA list, where the first TDRA list is used for configuring a quantity of times of retransmission on the target channel. The second information includes second DCI, where the second DCI is DCI scheduled by the network side device. The determining module 602 is further configured to determine, based on the second DCI and the first TDRA list, the target quantity of times of retransmission.

Optionally, in this embodiment of this application, the performing module 603 is further configured to: use the first TDRA list, and ignore a second TDRA list. The first TDRA list and the second TDRA list are different. The second TDRA list is a TDRA list agreed in a protocol and/or a TDRA list that is in system information and that does not belong to an SDT configuration.

Optionally, in this embodiment of this application, the target information includes random access preamble resource configuration information included in the first configuration information, and the random access preamble resource configuration information includes at least one of the following: configuration information of a random access preamble or configuration information of a random access preamble group, and the random access preamble resource configuration information is used for requesting for retransmission. The determining module 602 is configured to determine, after a first SDT procedure is triggered, in a case in which a MAC entity of the terminal selects a random access preamble resource in the random access preamble resource configuration information, that the target quantity of times of retransmission is equal to a quantity of times of transmitting target information Msg3, where the quantity of times of transmitting target Msg3 includes a quantity of times of retransmission corresponding to a latest time of initial transmission of Msg3, or a quantity of times of retransmission corresponding to a latest time of retransmission of Msg3.

Optionally, in this embodiment of this application, the first configuration information includes second configuration information in a configured grant CG corresponding to the terminal. The determining module 602 is configured to determine, after a second SDT procedure is triggered, that the target quantity of times of retransmission is a quantity of times of retransmission indicated by the second configuration information.

The data transmission apparatus for small data transmission SDT in this embodiment of this application may be an apparatus, an apparatus or an electronic device with an operating system, or may be a component, an integrated circuit, or a chip in a terminal. The apparatus or the electronic device may be a mobile terminal, or a non-mobile terminal. For example, the mobile terminal may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The data transmission apparatus for small data transmission SDT provided in this embodiment of this application can implement the processes implemented in the method embodiment in FIG. 2, and same technical effect can be achieved. To avoid repetition, details are not described herein again.

Figure 4:
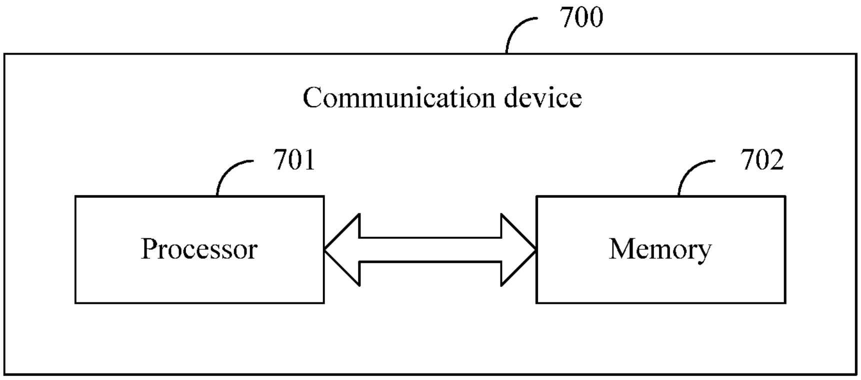
FIG. 4 is a schematic diagram of a structure of a communications device according to an embodiment of this application.

Optionally, as shown in FIG. 4, an embodiment of this application further provides a communications device 700, including a processor 701, a memory 702, and a program or an instruction that is stored in the memory 702 and that is executable on the processor 701. For example, when the communications device 700 is a terminal, the program or the instruction is executed by the processor 701 to implement the processes in the foregoing embodiment of the data transmission method for small data transmission SDT, and same technical effects can be achieved. When the communications device 700 is a network side device, the program or the instruction is executed by the processor 701 to implement the processes in the foregoing embodiment of the data transmission method for small data transmission SDT, and same technical effects can be achieved. To avoid repetition, details are not described herein again.

Figure 5:
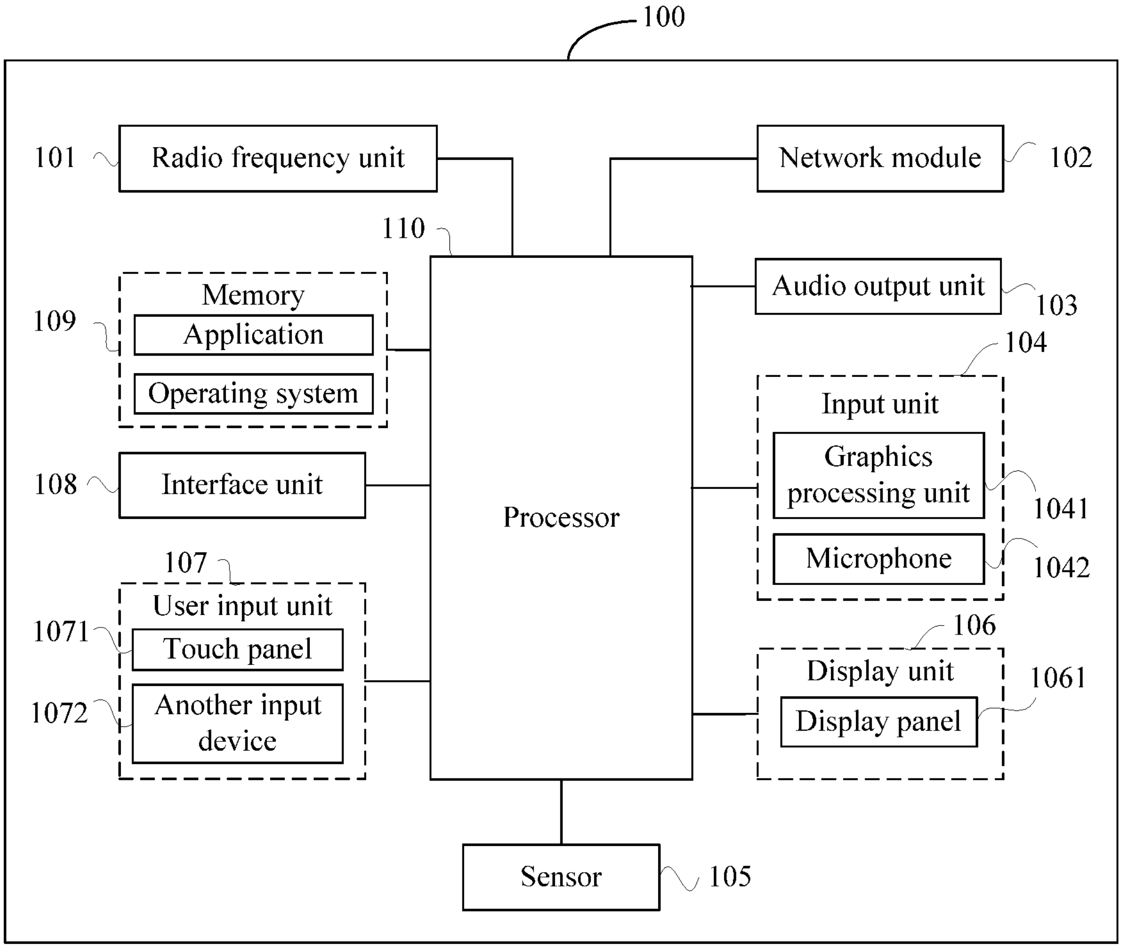
FIG. 5 is a schematic diagram of a hardware structure of a terminal according to an embodiment of this application.

An embodiment of this application further provides a terminal, including a processor and a communications interface. The communications interface is configured to obtain first configuration information, where the first configuration information includes at least one of a transmission resource or a transmission configuration parameter for SDT; the processor is configured to determine, after an SDT procedure is triggered, target information, where the target information is used to instruct the terminal to perform retransmission the target quantity of times of retransmission in the SDT procedure; and the communications interface is configured to perform retransmission based on the first configuration information and the target quantity of times of retransmission. This terminal embodiment corresponds to the foregoing method embodiment on the terminal side. Each implementation process and implementation of the foregoing method embodiment may be applicable to this terminal embodiment, and same technical effect can be achieved. Optionally, FIG. 5 is a schematic diagram of a hardware structure of a terminal according to an embodiment of this application.

A terminal 100 includes but is not limited to at least a part of components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the terminal 100 may further include a power supply (for example, a battery) that supplies power to each component. The power supply may be logically connected to the processor 110 by using a power supply management system, to implement functions such as charging and discharging management, and power consumption management by using the power supply management system. The structure of the terminal shown in FIG. 5 constitutes no limitation on the terminal, and the terminal may include more or fewer components than those shown in the figure, or combine some components, or have different component arrangements. Details are not described herein again.

It should be understood that in this embodiment of this application, the input unit 104 may include a graphics processing unit (GPU) 1041 and a microphone 1042. The graphics processing unit 1041 processes image data of a static picture or a video obtained by an image capture apparatus (for example, a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (for example, a volume control button or a power on/off button), a trackball, a mouse, and a joystick. Details are not described herein again.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application or an instruction required by at least one function (for example, a sound play function or an image play function). In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, an application processor and a modem processor may be integrated into the processor 110. The application processor mainly processes an operating system, a user interface, an application, an instruction, or the like. The modem processor mainly processes wireless communication, for example, a baseband processor. It can be understood that, alternatively, the modem processor may not be integrated into the processor 110.

The radio frequency unit 101 is configured to obtain first configuration information, where the first configuration information includes at least one of a transmission resource or a transmission configuration parameter that are for SDT; the processor 110 is configured to determine, after an SDT procedure is triggered, a target quantity of times of retransmission; and the processor 110 is configured to perform retransmission based on the first configuration information and the target quantity of times of retransmission.

According to the terminal provided in this embodiment of this application, the terminal first obtains the first configuration information that includes at least one of the transmission resource or the transmission configuration parameter that are for SDT, then the terminal determines the target quantity of times of retransmission after triggering the SDT procedure, and finally, the terminal performs retransmission based on the first configuration information and the target quantity of times of retransmission. In this way, the terminal can perform, after the small data transmission procedure is triggered, retransmission based on the determined quantity of times of retransmission, to avoid a data transmission failure due to a lack of a signaling exchange procedure in the transmission procedure because of one-off transmission in an area with relatively poor signal coverage.

Optionally, the radio frequency unit 101 is configured to: when a pre-specified condition is met, generate report information, and send the report information to a network side device; and the radio frequency unit 101 is further configured to receive second information from the network side device, where the second information is used to indicate the target quantity of times of retransmission.

Optionally, the processor 110 is further configured to determine, based on the first DCI, the target quantity of times of retransmission corresponding to retransmission on the target channel in the SDT procedure.

Optionally, the first configuration information further includes a first time domain resource allocation TDRA list, where the first TDRA list is used for configuring a quantity of times of retransmission on the target channel. The second information includes second DCI, where the second DCI is DCI scheduled by the network side device. The processor 110 is configured to determine, based on the second DCI and the first TDRA list, the target quantity of times of retransmission.

Optionally, the processor 110 is further configured to: use the first TDRA list, and ignore a second TDRA list. The first TDRA list and the second TDRA list are different. The second TDRA list is a TDRA list agreed in a protocol and/or a TDRA list that is in system information and that does not belong to an SDT configuration.

Optionally, the target information includes random access preamble resource configuration information included in the first configuration information, and the random access preamble resource configuration information includes at least one of the following: configuration information of a random access preamble or configuration information of a random access preamble group, and the random access preamble resource configuration information is used for requesting for retransmission. The processor 110 is configured to determine, after the terminal triggers a first SDT procedure, in a case in which a MAC entity of the terminal selects a random access preamble resource in the random access preamble resource configuration information, that the target quantity of times of retransmission is equal to a quantity of times of transmitting target information Msg3, where the quantity of times of transmitting target Msg3 includes a quantity of times of retransmission corresponding to a latest time of initial transmission of Msg3, or a quantity of times of retransmission corresponding to a latest time of retransmission of Msg3.

Optionally, the first configuration information includes second configuration information in a configured grant CG corresponding to the terminal. The processor is configured to determine, after the terminal triggers a second SDT procedure, that the target quantity of times of retransmission is a quantity of times of retransmission indicated by the second configuration information.

An embodiment of this application further provides a readable storage medium. The readable storage medium stores a program or an instruction. When the program or the instruction is executed by a processor, the processes in the foregoing embodiment of the data transmission method for small data transmission SDT are implemented, and same technical effect can be achieved. To avoid repetition, details are not described herein again.

The processor is a processor in the terminal in the foregoing embodiment. The readable storage medium may be non-volatile, or may be non-transitory. The readable storage medium may include a non-transitory computer-readable storage medium such as a read-only memory (ROM), a random access memory (RAM), a magnetic disk, an optical disc, or the like.

An embodiment of this application further provides a chip. The chip includes a processor and a communications interface. The communications interface is coupled to the processor, and the processor is configured to run a program or an instruction to implement the processes in the foregoing embodiment of the data transmission method for small data transmission SDT, and same technical effect can be achieved. To avoid repetition, details are not described herein again.

It should be understood that the chip mentioned in this embodiment of this application may also be referred to as a system-level chip, a system on chip, a chip system, or an on-chip system chip.

It should be noted that, in this specification, the term “include”, “comprise”, or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by “includes a . . . ” does not preclude the existence of other identical elements in the process, method, article, or apparatus that includes the element. In addition, it should be noted that the scope of the method and the apparatus in the embodiments of this application is not limited to performing functions in an illustrated or discussed order, and may further include performing functions in a basically simultaneous manner or in a reverse order according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a non-transitory storage medium (such as a ROM/RAM, a hard disk, or an optical disc), and includes several instructions for instructing a terminal (which may be a mobile phone, a computer, a server, an air-conditioner, a network device, or the like) to perform the method described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A data transmission method for small data transmission (SDT), wherein the method comprises:

obtaining, by a terminal, first configuration information, wherein the first configuration information comprises at least one of a transmission resource or a transmission configuration parameter that are for SDT;

determining, by the terminal after an SDT procedure is triggered, a target quantity of times of retransmission; and performing, by the terminal, retransmission based on the first configuration information and the target quantity of times of retransmission;

wherein the determining, by the terminal, the target quantity of times of retransmission comprises:

determining, by the terminal, target information, wherein the target information is used to instruct the terminal to perform retransmission the target quantity of times of retransmission in the SDT procedure; and determining, by the terminal based on the target information, the target quantity of times of retransmission.

2. The method according to claim 1, wherein the first configuration information comprises second configuration information in a configured grant (CG) corresponding to the terminal; and the performing, by the terminal, retransmission based on the first configuration information and the target quantity of times of retransmission comprises:

determining, after the terminal triggers a second SDT procedure, that the target quantity of times of retransmission is a quantity of times of retransmission indicated by the second configuration information.

3. The method according to claim 1, wherein before the determining, by the terminal target information, the method further comprises:

when a pre-specified condition is met, generating, by the terminal, report information, and sending the report information to a network side device; and the determining, by the terminal, target information comprises:

receiving, by the terminal, second information from the network side device, wherein the second information is used to indicate the target quantity of times of retransmission.

4. The method according to claim 3, wherein that the pre-specified condition is met comprises at least one of the following that:

a downlink (DL) pathloss reference measured by the terminal is less than or equal to a pre-specified threshold; or there is SDT data to be transmitted by the terminal.

5. The method according to claim 3, wherein the report information carries at least one of the following pieces of parameter information:

a result of a DL pathloss reference measured by the terminal;

a measurement result corresponding to a downlink reference signal selected by the terminal;

information indicating that the terminal has a retransmission capability; or information instructing the terminal to request to perform uplink retransmission.

6. The method according to claim 3, wherein the second information comprises first downlink control information (DCI), and the first DCI is used for scheduling a target channel; and before the step of performing, by the terminal, retransmission based on the first configuration information and the target quantity of times of retransmission, the method further comprises:

determining, by the terminal based on the first DCI, the target quantity of times of retransmission corresponding to retransmission on the target channel in the SDT procedure, wherein the first DCI comprises a target field, and a field value in the target field is used to indicate the target quantity of times of retransmission.

7. The method according to claim 3, wherein the first configuration information further comprises a first time domain resource allocation (TDRA) list, wherein the first TDRA list is used for configuring a quantity of times of retransmission on the target channel;

the second information comprises second DCI, wherein the second DCI is DCI scheduled by the network side device; and after the step of determining, by the terminal, target information, the method further comprises:

determining, by the terminal based on the second DCI and the first TDRA list, the target quantity of times of retransmission.

8. The method according to claim 7, wherein before the determining, by the terminal based on the second DCI and the first TDRA list, the target quantity of times of retransmission, the method further comprises:

using, by the terminal, the first TDRA list, and ignoring a second TDRA list, wherein the first TDRA list and the second TDRA list are different; and the second TDRA list is a TDRA list agreed in a protocol and/or a TDRA list that is in system information and that does not belong to an SDT configuration.

9. The method according to claim 1, wherein the target information comprises random access preamble resource configuration information comprised in the first configuration information, and the random access preamble resource configuration information comprises at least one of the following: configuration information of a random access preamble or configuration information of a random access preamble group, and the random access preamble resource configuration information is used for requesting for retransmission; and the performing, by the terminal, retransmission based on the first configuration information and the target quantity of times of retransmission comprises:

determining, after the terminal triggers a first SDT procedure, in a case in which a media access control (MAC) entity of the terminal selects a random access preamble resource in the random access preamble resource configuration information, that the target quantity of times of retransmission is equal to a quantity of times of transmitting target information Msg3, wherein the quantity of times of transmitting target information Msg3 comprises a quantity of times of retransmission corresponding to a latest time of initial transmission of Msg3, or a quantity of times of retransmission corresponding to a latest time of retransmission of Msg3.

10. A terminal, comprising a processor, a memory, and a program or an instruction that is stored in the memory and that is executable on the processor, wherein the program or the instruction, when executed by the processor, causes the terminal to perform:

obtaining first configuration information, wherein the first configuration information comprises at least one of a transmission resource or a transmission configuration parameter that are for small data transmission (SDT);

determining, after an SDT procedure is triggered, a target quantity of times of retransmission; and performing retransmission based on the first configuration information and the target quantity of times of retransmission;

wherein the program or the instruction, when executed by the processor, causes the terminal to perform:

determining target information, wherein the target information is used to instruct the terminal to perform retransmission the target quantity of times of retransmission in the SDT procedure; and determining based on the target information, the target quantity of times of retransmission.

11. The terminal according to claim 10, wherein the target information comprises random access preamble resource configuration information comprised in the first configuration information, and the random access preamble resource configuration information comprises at least one of the following: configuration information of a random access preamble or configuration information of a random access preamble group, and the random access preamble resource configuration information is used for requesting for retransmission; and the program or the instruction, when executed by the processor, causes the terminal to perform:

determining, after the terminal triggers a first SDT procedure, in a case in which a media access control (MAC) entity of the terminal selects a random access preamble resource in the random access preamble resource configuration information, that the target quantity of times of retransmission is equal to a quantity of times of transmitting target information Msg3, wherein the quantity of times of transmitting target information Msg3 comprises a quantity of times of retransmission corresponding to a latest time of initial transmission of Msg3, or a quantity of times of retransmission corresponding to a latest time of retransmission of Msg3.

12. The terminal according to claim 10, wherein the first configuration information comprises second configuration information in a configured grant (CG) corresponding to the terminal; and the program or the instruction, when executed by the processor, causes the terminal to perform:

determining, after the terminal triggers a second SDT procedure, that the target quantity of times of retransmission is a quantity of times of retransmission indicated by the second configuration information.

13. The terminal according to claim 10, wherein the program or the instruction, when executed by the processor, causes the terminal to further perform:

when a pre-specified condition is met, generating report information, and sending the report information to a network side device; and the program or the instruction, when executed by the processor, causes the terminal to perform:

receiving second information from the network side device, wherein the second information is used to indicate the target quantity of times of retransmission.

14. The terminal according to claim 13, wherein that the pre-specified condition is met comprises at least one of the following that:

a downlink (DL) pathloss reference measured by the terminal is less than or equal to a pre-specified threshold; or there is SDT data to be transmitted by the terminal.

15. The terminal according to claim 13, wherein the report information carries at least one of the following pieces of parameter information:

a result of a DL pathloss reference measured by the terminal;

a measurement result corresponding to a downlink reference signal selected by the terminal;

information indicating that the terminal has a retransmission capability; or information instructing the terminal to request to perform uplink retransmission.

16. The terminal according to claim 13, wherein the second information comprises first downlink control information (DCI), and the first DCI is used for scheduling a target channel; and the program or the instruction, when executed by the processor, causes the terminal to further perform:

determining, based on the first DCI, the target quantity of times of retransmission corresponding to retransmission on the target channel in the SDT procedure, wherein the first DCI comprises a target field, and a field value in the target field is used to indicate the target quantity of times of retransmission.

17. The terminal according to claim 13, wherein the first configuration information further comprises a first time domain resource allocation (TDRA) list, wherein the first TDRA list is used for configuring a quantity of times of retransmission on the target channel;

the second information comprises second DCI, wherein the second DCI is DCI scheduled by the network side device; and the program or the instruction, when executed by the processor, causes the terminal to further perform:

determining, based on the second DCI and the first TDRA list, the target quantity of times of retransmission.

18. The terminal according to claim 17, wherein the program or the instruction, when executed by the processor, causes the terminal to further perform:

using the first TDRA list and ignoring a second TDRA list, wherein the first TDRA list and the second TDRA list are different; and the second TDRA list is a TDRA list agreed in a protocol and/or a TDRA list that is in system information and that does not belong to an SDT configuration.

* * * * *